US012174314B2

(12) United States Patent
Hungar et al.

(10) Patent No.: US 12,174,314 B2
(45) Date of Patent: Dec. 24, 2024

(54) GENERATION OF NON-SEMANTIC REFERENCE DATA FOR POSITIONING A MOTOR VEHICLE

(71) Applicants: Volkswagen Aktiengesellschaft, Wolfsburg (DE); MAN TRUCK & BUS SE, Munich (DE)

(72) Inventors: Constanze Hungar, Braunschweig (DE); Daniel Wilbers, Wolfsburg (DE); Bernd Rech, Bokensdorf (DE); Niklas Koch, Wolfsburg (DE); Stefan Juergens, Braunschweig (DE); Christian Merfels, Braunschweig (DE)

(73) Assignees: VOLKSWAGEN AKTIENGESELLSCHAFT, Wolfsburg (DE); MAN TRUCK & BUS SE, Munich (DE)

( * ) Notice: Subject to any disclaimer, the term of this patent is extended or adjusted under 35 U.S.C. 154(b) by 272 days.

(21) Appl. No.: 17/628,970

(22) PCT Filed: Jun. 29, 2020

(86) PCT No.: PCT/EP2020/068242
§ 371 (c)(1),
(2) Date: Jan. 21, 2022

(87) PCT Pub. No.: WO2021/013475
PCT Pub. Date: Jan. 28, 2021

(65) Prior Publication Data
US 2022/0262034 A1 Aug. 18, 2022

(30) Foreign Application Priority Data
Jul. 23, 2019 (DE) ..................... 10 2019 119 852.6

(51) Int. Cl.
*G01S 7/41* (2006.01)
*G01C 21/00* (2006.01)
(Continued)

(52) U.S. Cl.
CPC ............ *G01S 7/41* (2013.01); *G01C 21/3833* (2020.08); *G01S 13/931* (2013.01);
(Continued)

(58) Field of Classification Search
CPC ........ G01S 7/41; G01S 13/931; G01S 7/4802; G01C 21/3833; G06F 16/906;
(Continued)

(56) References Cited

U.S. PATENT DOCUMENTS 7,433,509 B1 * 10/2008 Zhou .................... G06V 10/243
382/289
8,791,996 B2 * 7/2014 Miyajima ............... G06F 18/28
348/148

(Continued)

FOREIGN PATENT DOCUMENTS

| EP | 2372605 A2 | 10/2011 | ............. G01C 21/32 |
| EP | 3290864 A1 | 3/2018 | ............. G01C 21/28 |
| WO | 2021/013475 A1 | 1/2021 | ............... G01S 7/41 |

OTHER PUBLICATIONS

Kanji, Tanaka, "Unsupervised Part-based Scene Modeling for Visual Robot Localization," IEEE International Conference on Robotics and Automation (ICRA), pp. 6359-6365, May 26, 2015.
(Continued)

*Primary Examiner* — Kenny Nguyen
(74) *Attorney, Agent, or Firm* — Slayden Grubert Beard PLLC (57) ABSTRACT

A computer-implemented method for generating non-semantic reference data for determining the position of a motor vehicle involves a set of raw data points being
(Continued)

provided that models a stipulated surrounding area. A stipulated descriptor characterizing a property of the surrounding area is determined for each of the raw data points. At least one point cluster is generated by grouping the raw data points on the basis of their descriptors. A characteristic number relating to an information gain for determining the position of the motor vehicle is assigned to a first point cluster on the basis of the descriptors of the raw data points. The characteristic number is taken as a basis for storing feature information of the first point cluster on a memory unit as non-semantic reference data for determining the position.

14 Claims, 3 Drawing Sheets

(51) Int. Cl.
*G01S 13/931* (2020.01)
*G06F 16/906* (2019.01)
*G06T 7/73* (2017.01)
*G06V 20/56* (2022.01)

(52) U.S. Cl.
CPC .............. *G06F 16/906* (2019.01); *G06T 7/74* (2017.01); *G06V 20/56* (2022.01); *G06T 2207/10028* (2013.01); *G06T 2207/10044* (2013.01); *G06T 2207/30252* (2013.01)

(58) Field of Classification Search
CPC . G06F 18/23; G06F 18/28; G06T 7/74; G06T 2207/10028; G06T 2207/10044; G06T 2207/30252; G06V 20/56
See application file for complete search history.

(56) References Cited

U.S. PATENT DOCUMENTS

| | | | |
|---|---|---|---|
| 9,476,730 B2* | 10/2016 | Samarasekera | G01C 21/3867 |
| 9,488,492 B2* | 11/2016 | Samarasekera | G01C 21/3848 |
| 9,911,340 B2* | 3/2018 | Samarasekera | G01C 21/3673 |
| 10,198,707 B1* | 2/2019 | Bolton | G06Q 10/08355 |
| 10,586,163 B1* | 3/2020 | Mauseth | G06F 16/285 |
| 10,846,511 B2* | 11/2020 | Ozkucur | G01C 21/30 |
| 11,468,690 B2* | 10/2022 | Yuan | G06V 10/763 |
| 11,608,078 B2* | 3/2023 | He | G01C 21/3815 |
| 11,816,997 B2* | 11/2023 | Alexander | G06Q 50/30 |
| 2006/0019673 A1* | 1/2006 | Yagyu | H04W 72/54 |
| | | | 455/454 |
| 2011/0242311 A1* | 10/2011 | Miyajima | G06F 18/28 |
| | | | 348/116 |
| 2013/0173225 A1* | 7/2013 | Cai | G06F 30/23 |
| | | | 703/1 |
| 2014/0104310 A1* | 4/2014 | Kandogan | G06F 18/2321 |
| | | | 345/629 |
| 2015/0049943 A1* | 2/2015 | Hamsici | G06F 18/2415 |
| | | | 382/218 |
| 2015/0268058 A1* | 9/2015 | Samarasekera | G06V 10/811 |
| | | | 701/409 |
| 2015/0269438 A1* | 9/2015 | Samarasekera | G01C 21/3848 |
| | | | 382/154 |
| 2016/0003935 A1* | 1/2016 | Stainvas Olshansky | |
| | | | G01S 13/88 |
| | | | 342/70 |
| 2017/0053538 A1* | 2/2017 | Samarasekera | G08G 5/0069 |
| 2017/0242443 A1* | 8/2017 | Schuh | G05D 1/0257 |
| 2019/0129752 A1* | 5/2019 | Chang | G06F 9/4893 |
| 2019/0146500 A1* | 5/2019 | Yalla | G06F 16/29 |
| | | | 701/25 |
| 2019/0279049 A1* | 9/2019 | Doria | G06V 20/653 |
| 2020/0202107 A1* | 6/2020 | Ozkucur | G06F 18/211 |
| 2021/0088652 A1* | 3/2021 | Stoschek | G01S 13/93 |
| 2021/0323572 A1* | 10/2021 | He | G01C 21/3848 |
| 2021/0350147 A1* | 11/2021 | Yuan | G01C 21/3837 |

OTHER PUBLICATIONS

International Search Report and Written Opinion, Application No. PCT/EP2020/068242, 14 pages, Oct. 5, 2020.

* cited by examiner

GENERATION OF NON-SEMANTIC REFERENCE DATA FOR POSITIONING A MOTOR VEHICLE

CROSS-REFERENCE TO RELATED APPLICATIONS

This application claims priority to German Patent Application No. DE 10 2019 119 852.6, filed on Jul. 23, 2019 with the German Patent and Trademark Office. The contents of the aforesaid Patent Application are incorporated herein for all purposes.

TECHNICAL FIELD

The present invention relates to a computer-implemented method for generating non-semantic reference data for determining the position of a motor vehicle, wherein a set of raw data points is provided that models a stipulated surrounding area. The invention also relates to a method for positioning a motor vehicle, a map system for positioning a motor vehicle, a motor vehicle with a map system, a computer system for generating non-semantic reference data for positioning a motor vehicle, a computer program, and a computer-readable storage medium.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

For example to navigate or plan a trajectory, highly automated or autonomous motor vehicles require a precise knowledge of their own position. With known methods for determining the position, semantic structures and patterns, so-called landmarks, are for example recognized in the motor vehicle's surroundings by the vehicle sensors and are compared with corresponding entries in a digital map of the motor vehicle. Such semantic structures are always assigned to a predefined class, for example provided with information on the type of object, such as a traffic sign or an edge of a house.

Landmark-based localization has the disadvantage, however, that only those features of the surroundings are used for localization that may be assigned to a more or less generic class. This restricts the number of available features of the surroundings for localization so that, in regions in which no such landmarks are available, localization cannot be carried out, or only with low accuracy.

The position of a motor vehicle may also be determined using satellite signals from a global navigation satellite system. The accuracy of satellite receivers that are normally used in motor vehicles is however too slight to allow highly automated or autonomous driving. Highly precise satellite receivers in contrast are associated with significant expense.

SUMMARY

A need exists to provide an improved approach for positioning a motor vehicle.

The need is addressed by the subject matter of the independent claims.

Embodiments of the invention are described in the dependent claims, the following description, and the drawings.

DESCRIPTION

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

The improved approach is based on the idea of generating nonsemantic reference data by clustering the raw data points modeling the surroundings by using stipulated descriptors to describe properties of the surroundings, and corresponding feature information is saved depending on an informational gain that may contribute to the particular point clusters for positioning.

According to an independent exemplary aspect of the improved approach, a computer-implemented method is presented for the generation of nonsemantic reference data for positioning a motor vehicle. A set of raw data points is provided, in particular generated by an environmental sensor, that models a stipulated surrounding area. For each of the raw data points, a stipulated descriptor is determined by a computing unit and characterizes a property of the surrounding area at a position of the particular raw data point, or respectively at a position that corresponds to the particular raw data point in the surroundings. At least one point cluster is generated by the computing unit in that the raw data points are grouped into the point cluster, in particular by the computing unit, depending on their particular descriptors. A characteristic number relating to an informational gain for positioning the motor vehicle is assigned by the computing unit to a first point cluster of the at least one point cluster depending on the descriptors of the raw data points of the first point cluster. The characteristic number is taken as a basis for saving feature information of the first point cluster by means of the computing unit on a memory unit as non-semantic reference data for positioning.

The surrounding area in particular is a surrounding area of the environmental sensor, or respectively a data capture system, or data capture vehicle on which the environmental sensor is mounted. In particular, the raw data points are generated before the motor vehicle uses the reference data for positioning. The surrounding area is therefore a surrounding area of a potential position of the motor vehicle.

The environmental sensor may for example be designed as a radar sensor or lidar sensor, also termed a laser scanner. To model the surrounding area, the environmental sensor system generates a point cloud of sample points that in particular exist as a three-dimensional coordinate tuple. The raw data points that model the surrounding area are in particular such a point cloud or a part thereof.

The set of raw data points is provided in particular in computer-readable form so that the raw data points may be read by the computing unit. In particular, the generation of the raw data points is not necessarily part of the method for generating nonsemantic reference data according to the improved approach.

The particular benefit of the fact that the raw data points are generated beforehand and then provided is that highly precise measuring devices may be used to generate the raw data points.

The raw data points from the set of raw data points may for example exist as a corresponding coordinate tuple in a stipulated reference coordinate system, for example a global coordinate system or world coordinate system, for example a geodetic coordinate system such as for example WGS84.

The descriptor is in particular a property of the surrounding area such as a geometric property that may be measured using the raw data points. Geometrical properties that may serve as descriptors include in particular the curvature, or average curvature, of the sampled surfaces or regions in the surrounding area. Statistical properties of the raw data points, or respectively their distribution, or properties of the distribution of the raw data points may also serve as descriptors. Optical properties of the surroundings may also be reflected by the raw data points. In particular, the raw data points may also contain intensity information in addition to the spatial coordinates, or the intensity information may be assigned to the raw data points and provided. In the case of a lidar sensor, this is for example the intensity of the reflected laser beam. Since the emission characteristic, in particular the wavelength distribution of the emitted laser beam, is known, the spectral reflectivity or color of the corresponding point in the surroundings that corresponds to the raw data point may be determined by using the intensity. These properties may also serve as descriptors.

The stipulated descriptor may also include several values that are suitable as descriptors, or one or more of these derived variables.

By using the descriptors that are not linked to a level of importance of objects in the surroundings, a nonsemantic description of the surroundings is enabled.

In order to group the raw data points of the set of raw data points into the at least one point cluster, in particular each raw data point of the set of data points is either assigned to just one point cluster of the at least one point cluster, or the particular raw data point is discarded, or respectively rejected, i.e., not considered for the generation of the reference data.

The raw data points of the first point cluster are in particular those raw data points of the set of raw data points that form the first point cluster by grouping.

That the raw data points may be grouped independent of the descriptors may in particular be understood as meaning that the individual descriptors of the single data points are used for grouping, or that the descriptors of the raw data points are evaluated statistically, for example by averaging, or local averaging, or any other analysis of the distribution of the descriptors, and the grouping is performed by using the results of the statistical evaluation. Both features may also be combined, or respectively be performed sequentially in order to generate the at least one point cluster.

In particular, the raw data points may first be grouped by using their individual descriptors, for example into descriptor clusters, and the descriptor clusters may then be assigned cluster descriptors, for example based on the descriptors of their particular raw data points, that for example correspond to statistical characteristic values of the descriptors of the raw data points of the particular descriptor cluster, for example an average value, a, median value, etc. In a second step, the descriptor clusters may then be grouped into the point clusters by using other criteria, in particular by using their cluster descriptors.

That the characteristic number of the first point cluster concerns an informational gain for positioning the motor vehicle may for example be understood as meaning that the characteristic number indicates the influence that the use of the first point cluster for positioning the motor vehicle has on positioning accuracy. The characteristic value may for example indicate how clearly the first point cluster may be recognized, how many additional clusters are located in the immediate surroundings of the first point cluster, the difference of the cluster descriptors or the descriptors of the raw data points of the first point cluster in comparison to other point clusters of the at least one point cluster, etc.

In other words, the characteristic number may express how significant a feature of the surrounding area is that is depicted by the first point cluster. In this case, the feature may for example be considered all the more significant the greater the distinctiveness of the feature, the greater the uniqueness or singularity of the feature, and the lower the density of other features in the surroundings of the particular feature. These properties may be quantified by stipulated rules or guidelines so that the indication of how significant the feature is may be quantified and therefore measured according to stipulated rules.

Each of the point clusters may in particular be assigned a corresponding feature in the surrounding area, or may be understood as a corresponding feature.

The features that are represented by the point cluster are non-semantic in nature; they are therefore not necessarily assigned an importance.

The feature information contains for example a position of the first point cluster, for example an average or characteristic position of the raw data points of the first point cluster, a spatial extent of the raw data points of the first point cluster, or other geometric properties of the first point cluster or the raw data of the first point cluster. The feature information may also contain the descriptors of the raw data points and/or the cluster descriptor of the first point cluster.

The feature information may be saved depending on the characteristic number, for example by jointly saving the feature information and the associated characteristic number, or respectively the feature information contains the characteristic number itself. Alternatively or in addition, the feature information of the first point cluster may for example only be saved when the characteristic number lies above a stipulated threshold. Alternatively or in addition, the feature information may be saved in a marked form when the characteristic number is less than the stipulated threshold in order to identify that the particular point cluster is only slightly suitable for positioning.

By saving the feature information depending on the characteristic number, a high reference data quality is assured, and in particular a high accuracy of positioning by the reference data is enabled.

Since the surrounding area may be described by using nonsemantic features, the method, according to the improved approach, makes it possible to generate reference data for positioning largely independent of the content of the surrounding area, i.e., independent of which objects or structures are located within the surrounding area. The improved approach is therefore universally and flexibly applicable and is in particular independent of the presence of semantic landmarks.

In particular, the features described by the point cluster may also relate to features in the environment that are not intuitively recognizable by humans.

According to the improved approach, the descriptors of the raw data points are used as means for identifying features in the surroundings as such, and for using very significant features for positioning, or respectively for saving them as reference data. The fact for example is exploited that the distribution, in particular spatial distribution, of the descriptors of the raw data points for distinctive features, i.e., in particular clearly recognizable features, are distinguished from non-distinctive features, for example objects with very complex surfaces. The features are depicted in the form of feature information without substantive importance and reused.

In some embodiments of the method for providing the reference data for positioning, the method includes the detection of sensor measurement data by using the environmental sensor system and generating the raw data points based on the sensor measurement data.

In some embodiments, each point cluster of the at least one point cluster is assigned a particular characteristic number by the computing unit depending on the particular descriptors of the raw data points of the particular point cluster, said characteristic number relating to the particular information gain for positioning the motor vehicle by the particular point cluster. Particular feature information of the point clusters of the at least one point cluster are saved in the memory unit depending on the particular characteristic numbers of the point clusters.

This allows numerous features in the surrounding area to be identified in a nonsemantic matter and provided for positioning as reference data.

In some embodiments, a spatial distribution of all point clusters of the at least one point cluster is analyzed by the computing unit. Depending on a result of the spatial distribution analysis, a localization characteristic value for the first point cluster and, if applicable, for all additional point clusters of the at least one point cluster is determined. The characteristic number of the first point cluster is determined by the computing unit depending on the localization characteristic value of the first point cluster. The same holds true, if applicable, for the characteristic numbers of the other point clusters.

The localization characteristic value quantifies in particular the extent of the density of point clusters of the at least one point cluster at the position of the first point cluster, i.e., in particular in immediate surroundings of the first point cluster.

The more point clusters are located in the immediate surroundings of the first point cluster, the less suitable is the first point cluster for positioning, or respectively, the less the informational gain that the first point cluster may contribute to positioning.

Accordingly, the localization characteristic value is for example all the more greater the smaller the density of point clusters at the position of the first point cluster.

In particular, the characteristic number of the first point cluster is all the more greater the greater the localization characteristic value for the first point cluster.

By giving priority to more localized features in the surrounding area, reliability, or respectively accuracy of the potential positioning by using the reference data is increased.

In some embodiments, a number of point clusters of the at least one point cluster is determined by the computing unit that are located within a stipulated sector of the surrounding area in which the first point cluster is located. The localization characteristic value is determined depending on the number of point clusters in the stipulated sector.

For example, the localization characteristic value may be additionally determined depending on the overall number of point clusters of the at least one point cluster, for example as a ratio of the number of point clusters in the stipulated sector to the overall number.

For example, the surrounding area may be entirely divided into several stipulated sectors, including the sector in which the first point cluster is located.

The localization characteristic value may for example then be determined depending on an average number of point clusters in the different sectors. For example, the localization characteristic value may be determined as a ratio of the number of point clusters in the sector in which the first point cluster is located to the average number of point clusters in all sectors.

In these embodiments, in particular an average density of point clusters is used in order to determine the localization characteristic value.

In some embodiments, the localization characteristic value is all the more smaller the larger the number of point clusters that are located in the stipulated sector of the first point cluster.

In some embodiments, a singularity characteristic value for the first point cluster is determined by the computing unit depending on the descriptors of the raw data points of the first point cluster, and depending on the descriptors of the raw data points of a second point cluster of the at least one point cluster. The characteristic number is determined depending on the singularity characteristic value, and in particular depending on the localization characteristic value, of the first point cluster.

The singularity or uniqueness of a point cluster, or respectively a feature that corresponds to the point cluster, may be understood as a characteristic value for a deviation of the descriptors of the raw data points of the particular point cluster, or respectively the cluster descriptor of the particular point cluster, in comparison to other point clusters of the at least one point cluster. In particular, the descriptors or cluster descriptors of all point clusters of the at least one point cluster may be used to determine the singularity characteristic number of the first point cluster.

By giving priority to unique or singular features, or respectively point clusters, in particular such features for positioning are favored that resemble the other features in the surrounding area as little as possible. Accordingly, the quality of the reference data, i.e., in particular the accuracy of positioning achievable by the reference data, may be further increased.

In some embodiments, the singularity characteristic value of the first point cluster is all the more larger the more the descriptors of the raw data points of the first point cluster differ from the descriptors of the second point cluster, or the more the cluster descriptors of the first point cluster differ from the cluster descriptor of the second point cluster.

In some embodiments, the singularity characteristic value and the localization characteristic value are weighted by the computing unit, and the characteristic number is determined depending on the weighted singularity characteristic value and the weighted localization characteristic value.

This makes it possible to assign a greater importance to the singularity characteristic value or the localization characteristic value depending on the application, or respectively the type of employed descriptors.

In some embodiments, at least one descriptor cluster is generated by the computing unit in that the raw data points are grouped depending on their particular descriptors and independent of their particular spatial positions. The at least one point cluster is generated by spatially grouping the raw data points, wherein each descriptor cluster of the at least one descriptor cluster is identical to one of the point clusters of the at least one point cluster, or is separated in order to form at least two of the point clusters of the at least one point cluster.

In order to generate the at least one descriptor cluster, those raw data points are grouped whose descriptors have similar values. Since the spatial positions of the raw data points are not considered for this, a descriptor cluster may also be spatially incoherent according to a stipulated criterion.

A descriptor cluster may therefore be understood in particular to mean a subset of raw data points of the set of raw data points that have similar descriptors according to a stipulated definition and in particular are formed by using a known method for cluster analysis.

A descriptor cluster may accordingly represent one or more features in the surrounding area. By using the descriptors and neglecting the spatial position, for example two objects that are spatially separate from each other but are otherwise identical or similar may lead to raw data points of the same descriptor cluster. For example, two walls that are arranged spatially separate from each other may be assigned to the same descriptor cluster in the surrounding area.

In some embodiments, a cluster descriptor is determined for each descriptor cluster by the computing unit, for example by statistically evaluating the descriptors of the raw data points depending on the descriptors of the raw data points of the descriptor cluster. The cluster descriptor may for example correspond to an average of the descriptors of the raw data points of the descriptor cluster, or another statistical parameter.

This may allow joint further processing of the raw data points of a descriptor cluster, which results in a reduced memory and/or computing requirement.

In some embodiments, all raw data points of the set of raw data points that cannot be assigned to any of the descriptor clusters according to a stipulated rule are rejected and not used any further to generate the reference data.

In some embodiments, a distinctiveness characteristic value for the first point cluster is determined by the computing unit depending on the descriptors of the raw data points of the first point cluster. The characteristic number is determined depending on the distinctiveness characteristic value, and in particular depending on the localization characteristic value, and for example depending on the singularity characteristic value, of the first point cluster.

The distinctiveness characteristic value may always be determined differently depending on the type of employed descriptors or raw data points.

In particular, to determine the distinctiveness characteristic value, a distribution of the values of the descriptors of the raw data points of the first point cluster are determined and compared with stipulated criteria.

For example by using the distribution, it may be determined whether the descriptors of the first point cluster are distributed in a unimodal or multimodal fashion, how many local maxima the distribution has, how large the maximum values of the local maxima are, how wide the distribution, or respectively individual subdistributions, of the distribution is/are, etc. For example, jumps in the distribution may be used to determine the distinctiveness characteristic value.

In some embodiments, a histogram of the descriptors of the raw data points of the first point cluster are generated by the computing unit, and the histogram is analyzed to determine the distinctiveness characteristic value.

The distinctiveness characteristic value describes in particular how well the first point cluster may be described, for example how clearly the feature that describes the first point cluster may be determined per se in the surroundings.

Since features with a higher distinctiveness characteristic value are prioritized, greater reliability for positioning may be achieved.

In some embodiments, a corresponding distinctiveness characteristic value is determined for each descriptor cluster of the at least one descriptor cluster. The distinctiveness characteristic value of the first point cluster then corresponds to the distinctiveness characteristic value of the descriptor cluster from which the first point cluster originates.

The first point cluster therefore more or less inherits the distinctiveness characteristic value from the associated descriptor cluster.

In some embodiments, the distribution of the descriptors of the raw data points of the first point cluster is determined by the computing unit, and the distinctiveness characteristic value is determined depending on the distribution.

In some embodiments, the feature information of the first point cluster is saved on the memory unit by the computing unit depending on the distinctiveness characteristic value.

In particular, the feature information may for example only be saved on the memory unit when the distinctiveness characteristic value is greater than a stipulated additional threshold.

In some embodiments, the distinctiveness characteristic value, the singularity characteristic value and the localization characteristic value are weighted by the computing unit, and the characteristic number is determined depending on the weighted singularity characteristic value, the weighted singularity value and the weighted localization characteristic value.

According to another independent exemplary aspect of the improved approach, a method is offered for positioning a motor vehicle. Image data of surroundings of the motor vehicle are generated by an environmental sensor of the motor vehicle. By means of another computing unit of the motor vehicle, the image data are compared with stipulated reference data for positioning that in particular are saved on a digital map or a map system of the motor vehicle. A position of the motor vehicle is determined by the additional computing unit depending on a result of the comparison. The reference data on positioning were generated by using a method for determining reference data for positioning according to an improved approach.

According to another independent exemplary aspect of the improved approach, a map system, in particular a digital map system, in particular a digital map or HD map, for positioning a motor vehicle is offered. The map system has an additional memory unit, wherein reference data for positioning are saved on the additional memory unit that were generated according to the improved approach by a method for determining reference data to position a motor vehicle.

The memory unit on which the feature information is saved according to the method according to the improved approach is in particular the additional memory unit of the map system.

According to another independent exemplary aspect of the improved approach, a motor vehicle is presented that has a map system for positioning according to the improved approach.

According to an additional independent exemplary aspect of the improved approach, a computer system is presented for the generation of reference data for positioning a motor vehicle. The computer system has a computing unit and a memory unit. The computing unit is configured to receive a set of raw data points that models a stipulated surrounding area. The computing unit is configured to determine a descriptor for each of the raw data points that characterize a property of the surrounding area at a position of the particular raw data point. The computing unit is configured to generate at least one point cluster by grouping the raw data points depending on their descriptors. The computing unit is configured to assign a characteristic number relating to an informational gain for positioning the motor vehicle to a first point cluster of the at least one point cluster depending on the descriptors of the raw data points of the first point cluster. The computing unit is configured to save feature information of the first point cluster as reference data on positioning on the memory unit depending on the characteristic number.

That the computing unit is configured to receive the set of raw data points may in particular be understood as meaning that the raw data points may be read by the computing unit.

Other embodiments of the computing system according to the improved approach are directly apparent from the various embodiments of the method for generating non-semantic reference data for positioning according to the improved approach, and vice versa. In particular, a computer system is configured or programmed according to the improved approach to perform a method for generating non-semantic reference data according to the improved approach, or the computer system performs such a method.

According to another independent exemplary aspect of the improved approach, a computer program having commands is presented. When the computer program is being run by a computer system, in particular a computer system according to the improved approach, in particular by the computing unit of the computer system, the commands of the computer system cause a method for determining non-semantic reference data to be performed according to the improved approach.

According to another independent exemplary aspect of the improved approach, a computer-readable storage medium is presented on which a computer program according to the improved approach is saved.

The invention also includes combinations of the features of the described embodiments.

Reference will now be made to the drawings in which the various elements of embodiments will be given numerical designations and in which further embodiments will be discussed.

In the exemplary embodiments described herein, the described components of the embodiments each represent individual features that are to be considered independent of one another, in the combination as shown or described, and in combinations other than shown or described. In addition, the described embodiments can also be supplemented by features of the invention other than those described.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

Figure 1:
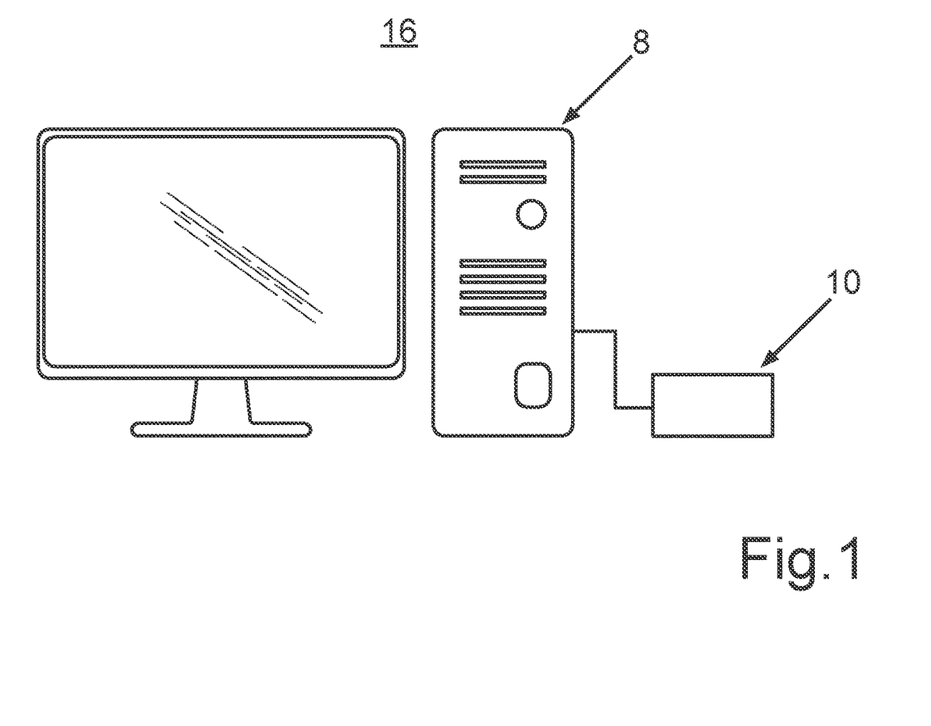
FIG. 1 shows an exemplary embodiment of a computer system.

FIG. 1 schematically shows a computer system 16 according to the improved approach. The computer system 16 has a computing unit 8 and a memory unit 10. On the memory unit 10, for example a set of raw data points is saved that models a stipulated surrounding area, i.e., a potential surrounding area of a motor vehicle 6.

The function of the computer system 16 will be described in greater detail below with reference to exemplary embodiments of a method for generating reference data according to the improved approach as for example illustrated in FIG. 2.

Figure 2:
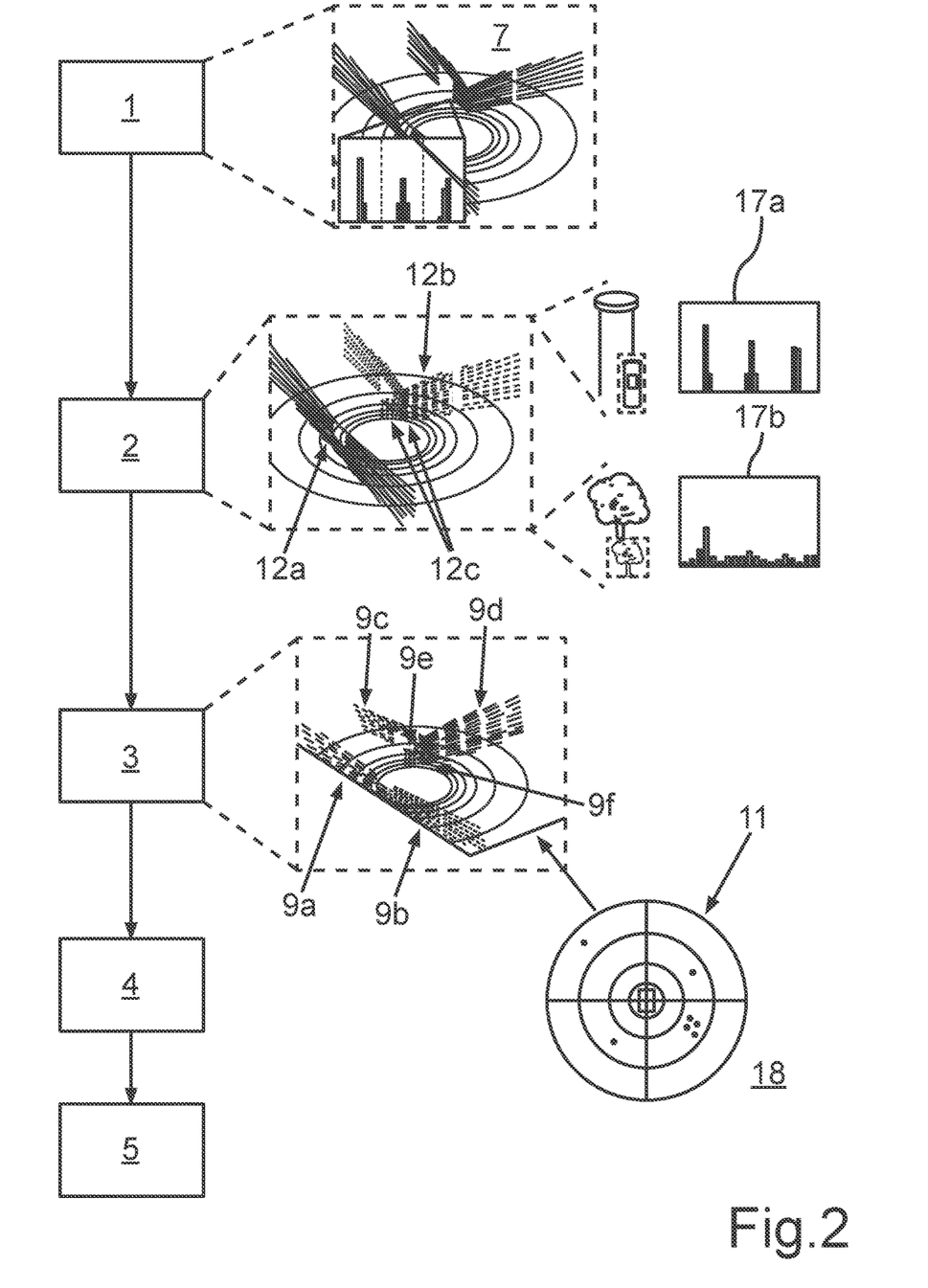
FIG. 2 shows a flowchart of an exemplary embodiment of a method for determining non-semantic reference data.

FIG. 2 shows a flowchart of an exemplary embodiment of a method for generating non-semantic reference data for positioning a motor vehicle 6.

In step 1 of the method, the set of raw data points 7 is provided by saving it on the memory unit 10 in a computer readable form, i.e., in particular readable by the computing unit 8. The set of raw data points 7 corresponds for example to a point cloud that was generated previously by a lidar system.

Each of the raw data points 7 is assigned a stipulated descriptor by the computing unit 8, or respectively the corresponding descriptor is calculated for each raw data point 7 by the computing unit 8, wherein the descriptor characterizes in particular a geometric property of the surrounding area at the position that is depicted by the particular raw data point, for example a curvature or average curvature of the surroundings, or an object in the surroundings at the position of the particular raw data point. Depth information may also be used in addition or alternatively as the descriptor.

In step 2 of the method, the raw data points are grouped into descriptor clusters 12a, 12b, 12c by combining raw data points 7 with similar descriptors. That is, similar descriptors are grouped into descriptor clusters 12a, 12b, 12c by a clustering method.

In this step, such features in the surrounding area 11 that relate to similar objects may for example be combined into a joint descriptor cluster 12a, 12b, 12c, for example all wall-like descriptions may be combined into one descriptor cluster 12a, 12b, 12c.

In step 2, the raw data 7 that cannot be assigned to any of the descriptor clusters 12a, 12b, 12d according to stipulated criteria are discarded and then not used any further.

In step 2, a distinctiveness characteristic value may be determined in particular for each of the descriptor clusters 12a, 12b, 12c, in particular based on the descriptors of the corresponding raw data points 7 of the particular descriptor cluster 12a, 12b, 12c. The distinctiveness characteristic value quantifies how describable and recognizable the descriptors of the particular descriptor cluster 12a, 12b, 12c are.

In step 2, all descriptor clusters 12a, 12b, 12c whose distinctiveness characteristic value lies below a stipulated threshold may moreover for example be removed and not considered anymore.

To explain by way of example, FIG. 2 schematically shows distributions 17a, 17b of two descriptor clusters 12a, 12b, 12c. For example, the distribution 17a may be the distribution of curvature values as descriptors for an advertising column, and the distribution 17b may be a corresponding distribution for a tree. Whereas the distribution 17a has a high distinctiveness since it has three pronounced maxima, the distribution 17b is perhaps unsuitable to be used for positioning since it refers to a relatively homogeneous distribution of the descriptors, and therefore to a low distinctiveness characteristic value.

In step 3 of the method, the descriptor clusters 12a, 12b, 12c are spatially separate from each other so that corresponding point clusters 9a, 9b, 9c, 9d, 9e, 9f are generated by the computing unit 8. For example, two house walls positioned at different locations in the surroundings may fall within the same descriptor cluster 12a, 12b, 12c, but in different point clusters 9a, 9b, 9c, 9d, 9e, 9f.

The point clusters 9a, 9b, 9c, 9d, 9e, 9f take in particular the distinctiveness characteristic values of the particular descriptor clusters 12a, 12b, 12c from which they originate.

In step 3, a uniqueness characteristic value or singularity characteristic value may also be determined by the computing unit for each of the point clusters 9a, 9b, 9c, 9d, 9e, 9f. The uniqueness, or respectively singularity of a point cluster 9a, 9b, 9c, 9d, 9e, 9f quantifies in particular the difference of the particular point cluster 9a, 9b, 9c, 9d, 9e, 9f from other point clusters 9a, 9b, 9c, 9d, 9e, 9f.

The singularity characteristic value may in particular be determined in that the difference between descriptors of the individual point clusters 9a, 9b, 9c, 9d, 9e, 9f is described by the computing unit 8 according to a stipulated mathematical rule.

If for example many house walls are in the surrounding area 11, the singularity characteristic value of the individual associated point clusters 9a, 9b, 9c, 9d, 9e, 9f is less than if there were only one house wall there.

In step 3, a localization characteristic value may also be assigned in addition to the point clusters 9a, 9b, 9c, 9d, 9e, 9f. For this purpose, a spatial distribution 18 of the point clusters 9a, 9b may in particular be analyzed. In particular, the surrounding area 11 may be divided by the computing unit 8 into a stipulated number of subareas, and the number of point clusters that lie within the subareas may be determined. The more point clusters there are in a subarea, the lower the localization characteristic value for the point clusters 9a, 9b, 9c, 9d, 9e, 9f in this subarea.

In step 4 of the method, an associated characteristic number relating to an informational gain for positioning the motor vehicle is determined by the computing unit 8 for each of the point clusters 9a, 9b, 9c, 9d, 9e, 9f depending on the localization characteristic value, the singularity characteristic value, and the distinctiveness characteristic value. In particular, the characteristic number is all the more higher the higher the localization characteristic value of the particular point cluster, the singularity characteristic value and/or the distinctiveness characteristic value of the particular point cluster 9a, 9b, 9c, 9d, 9e, 9f.

Together, the localization characteristic value, singularity characteristic value and distinctiveness characteristic value describe how significant a feature is in the surrounding area 11 that is described by the particular point clusters 9a, 9b, 9c, 9d, 9e, 9f. The more significant the feature, the higher the informational gain, the more valuable, so to speak, the corresponding point cluster 9a, 9b, 9c, 9d, 9e, 9f for positioning the motor vehicle.

In step 5 of the method, feature information for each of the point clusters 9a, 9b, 9c, 9d, 9e, 9f are saved in the memory unit 10, in particular corresponding spatial positions, extents, or other geometric information of the point clusters 9a, 9b, 9c, 9d, 9e, 9f, as well as for example the particular characteristic number, or respectively the particular characteristic values of the point clusters 9a, 9b, 9c, 9d, 9e, 9f when the characteristic number relating to the informational gain of the particular point cluster 9a, 9b, 9c, 9d, 9e, 9f is greater than an associated stipulated threshold.

Accordingly in particular, only those features, or respectively point clusters 9a, 9b, 9c, 9d, 9e, 9f are saved on the memory unit as non-semantic reference data for positioning that are sufficiently pronounced, which is defined by the threshold.

Figure 3:
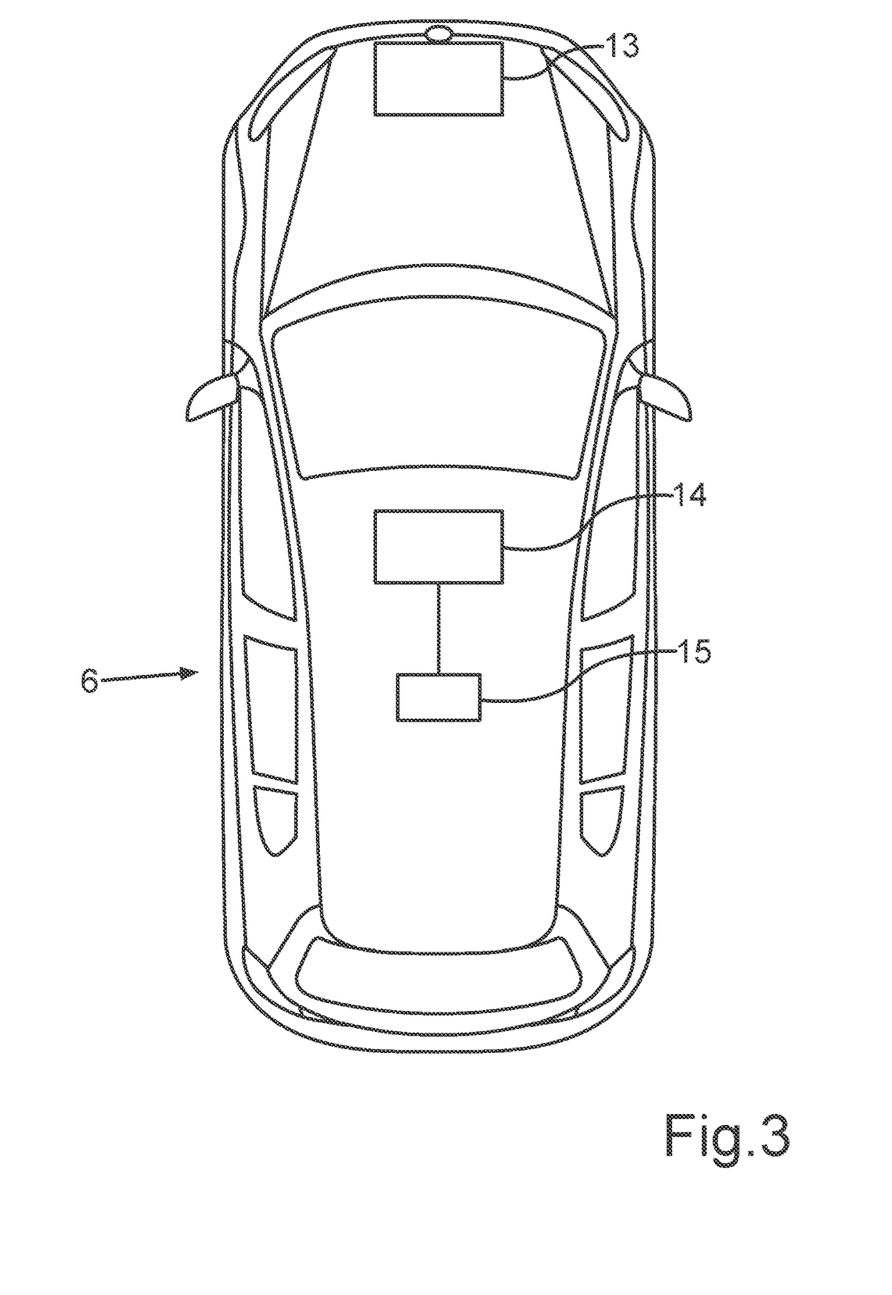
FIG. 3 shows a motor vehicle with an exemplary embodiment of a map system.

FIG. 3 shows a motor vehicle 6 that has another computing unit 14, as well as an environmental sensor system 13, for example a camera, a lidar system, or a radar system.

The motor vehicle 6 moreover has a digital map 15, in particular another memory unit on which a digital map 15 is saved. The digital map 15 contains reference data for positioning that were generated according to a method according to the improved approach.

Image data of surroundings of the motor vehicle 6 may be generated by the environmental sensor 13 of the motor vehicle 6. The computing unit 14 may compare the image data with the reference date on the digital map 15.

Features that are represented by the reference data may be identified by the comparison in the image data so that the position of the motor vehicle 6 may be determined.

As described, the improved approach therefore makes it possible to provide and use non-semantic reference data for positioning a motor vehicle.

By means of the improved approach, highly precise raw data points may be used in order to generate non-semantic, significant reference data for digital maps in order to enable the precise localization of a motor vehicle.

In various embodiments, the amount of memory for the digital map is significantly reduced by the combination of similar descriptors of the raw data points in comparison to directly saving the raw data points.

The improved approach therefore makes it possible to create highly precise, globally referenced maps in which nonsemantic features are saved together with the description.

LIST OF REFERENCE NUMERALS

1 Method step
2 Method step
3 Method step
4 Method step
5 Method step
6 Motor vehicle
7 Raw data points
8 Computing unit
9a, 9b, 9c, 9d, 9e, 9f Point cluster
10 Memory unit
11 Surrounding area
12a, 12b, 12c Descriptor cluster
13 Environment sensor
14 Computing unit
15 Digital map
16 Computer system
17a Distribution
17b Distribution
18 Spatial distribution The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" used throughout the specification means "serving as an example, instance, or exemplification".

The mere fact that certain measures are recited in mutually different dependent claims or embodiments does not indicate that a combination of these measures cannot be used to advantage. Any reference signs in the claims should not be construed as limiting the scope.

What is claimed is:

1. A computer-implemented method for generating non-semantic reference data for determining the position of a motor vehicle, wherein a set of raw data points is provided that models a surrounding geographic area of the motor vehicle, comprising:
   each raw data point comprising a coordinate tuple representing a spatial location in the surrounding geographic area of the motor vehicle;
   for each respective raw data point of the raw data points, determining, by a computing unit, a stipulated descriptor that characterizes a physical property of the surrounding geographic area of the motor vehicle at the spatial location represented by the respective raw data point;
   using the computing unit, generating multiple point clusters by grouping the raw data points based on their stipulated descriptors;
   determining a uniqueness characteristic value for a first point cluster of the multiple point clusters, the uniqueness characteristic value indicating a deviation of the stipulated descriptors of the raw data points of the first point cluster compared to the stipulated descriptors of the raw data points of other point clusters of the multiple point clusters;
   determining a characteristic number indicating a level of informational gain for positioning the motor vehicle by the computing unit to a first point cluster of the multiple point clusters depending at least on the uniqueness characteristic value of the first point cluster, wherein increasing the uniqueness characteristic value increases the characteristic number;
   comparing the characteristic number to a threshold;
   if the characteristic number exceeds the threshold, saving feature information of the first point cluster in a memory unit as non-semantic reference data for determining the position of the motor vehicle; and
   if the characteristic number is less than or equal to the threshold, not saving feature information of the first point cluster in the memory unit.

2. The method of claim 1, comprising, using the computing unit:
   analyzing a spatial distribution of all point clusters of the multiple point clusters;
   depending on a result of the spatial distribution analysis, determining a localization characteristic value for the first point cluster; and
   determining the characteristic number depending at least on the localization characteristic value and the uniqueness characteristic value of the first point cluster.

3. The method of claim 2, comprising, using the computing unit:
   determining a number of point clusters that are located within a stipulated sector of a surrounding geographic area in which the first point cluster is located; and
   determining the localization characteristic value depending on the determined number of point clusters, the localization characteristic representing a density of point clusters in the stipulated sector including the first point cluster.

4. The method of claim 3, wherein generating the multiple point clusters by grouping the raw data points based on their stipulated descriptors comprises:
   generating at least one descriptor cluster in that the raw data points are grouped depending on their stipulated descriptors and independent of their particular spatial positions; and
   generating the multiple point clusters by spatially grouping the raw data points, wherein each descriptor cluster is identical to one of the point clusters, or is separated in order to form at least two point clusters.

5. The method of claim 2, wherein generating the multiple point clusters by grouping the raw data points based on their stipulated descriptors comprises:
   generating at least one descriptor cluster in that the raw data points are grouped depending on their stipulated descriptors and independent of their particular spatial positions; and
   generating the multiple point clusters by spatially grouping the raw data points, wherein each descriptor cluster is identical to one of the point clusters, or is separated in order to form at least two point clusters.

6. The method of claim 1, wherein generating the multiple point clusters by grouping the raw data points based on their stipulated descriptors comprises:
   generating at least one descriptor cluster in that the raw data points are grouped depending on their stipulated descriptors and independent of their particular spatial positions; and
   generating the multiple point clusters by spatially grouping the raw data points, wherein each descriptor cluster is identical to one of the point clusters, or is separated in order to form at least two point clusters.

7. The method of claim 1, comprising, using the computing unit:
   determining a distinctiveness characteristic value for the first point cluster depending on the stipulated descriptors of the raw data points of the first point cluster; and
   determining the characteristic number depending at least on the distinctiveness characteristic value and the uniqueness characteristic value of the first point cluster.

8. The method of claim 7, comprising, using the computing unit:
   determining a distribution of the stipulated descriptors of the raw data points of the first point cluster; and
   determining the distinctiveness characteristic value depending on the distribution.

9. The method of claim 7, comprising: saving the feature information of the first point cluster on the memory unit by the computing unit depending on the distinctiveness characteristic value.

10. The method of claim 7, comprising: saving the feature information of the first point cluster on the memory unit by the computing unit only when the distinctiveness characteristic value is greater than or equal to a stipulated threshold.

11. The method of claim 1, wherein the characteristic number indicates the influence that a use of the first point cluster for positioning the motor vehicle has on positioning accuracy.

12. A method for positioning a motor vehicle, comprising:
generating image data of surroundings of the motor vehicle by an environmental sensor of the motor vehicle;
using an additional computing unit, comparing the image data with stipulated reference data for positioning; and
determining a position of the motor vehicle by the additional computing unit depending on a result of the comparison; wherein the reference data for positioning are generated by the method of claim 1.

13. A computer system for generating non-semantic reference data for positioning a motor vehicle, the computer system having a computing unit and a memory unit, wherein the computing unit is configured to receive a set of raw data points that models a stipulated surrounding geographic area;
wherein each raw data point comprises a coordinate tuple representing a spatial location in the surrounding geographic area of the motor vehicle;
wherein the computing unit is configured:
to determine, for each respective raw data point of the raw data points, a stipulated descriptor that characterizes a physical property of the surrounding geographic area at of the motor vehicle at the spatial location represented by the respective raw data point;
to generate multiple point clusters by grouping the raw data points based on their stipulated descriptors;
to determine a uniqueness characteristic value for a first point cluster of the multiple point clusters, the uniqueness characteristic value indicating a deviation of the stipulated descriptors of the raw data points of the first point cluster compared to the stipulated descriptors of the raw data points of other point clusters of the multiple point clusters;
to determine a characteristic number indicating a level of informational gain for positioning the motor vehicle by the computing unit to a first point cluster of the multiple point clusters depending at least on the uniqueness characteristic value of the first point cluster, wherein increasing the uniqueness characteristic value increases the characteristic number;
depending on the characteristic number, to save feature information of the first point cluster on the memory unit as reference data for determining the position;
to compare the characteristic number to a threshold;
if the characteristic number exceeds the threshold, to save feature information of the first point cluster in a memory unit as non-semantic reference data for determining the position; and
if the characteristic number is less than or equal to the threshold, not to save feature information of the first point cluster in the memory unit.

14. A non-transitory medium with commands that, when the commands are being executed by a computer system, cause the computer system to perform the method of claim 1.

* * * * *